United States Patent Office 3,572,189
Patented Mar. 23, 1971

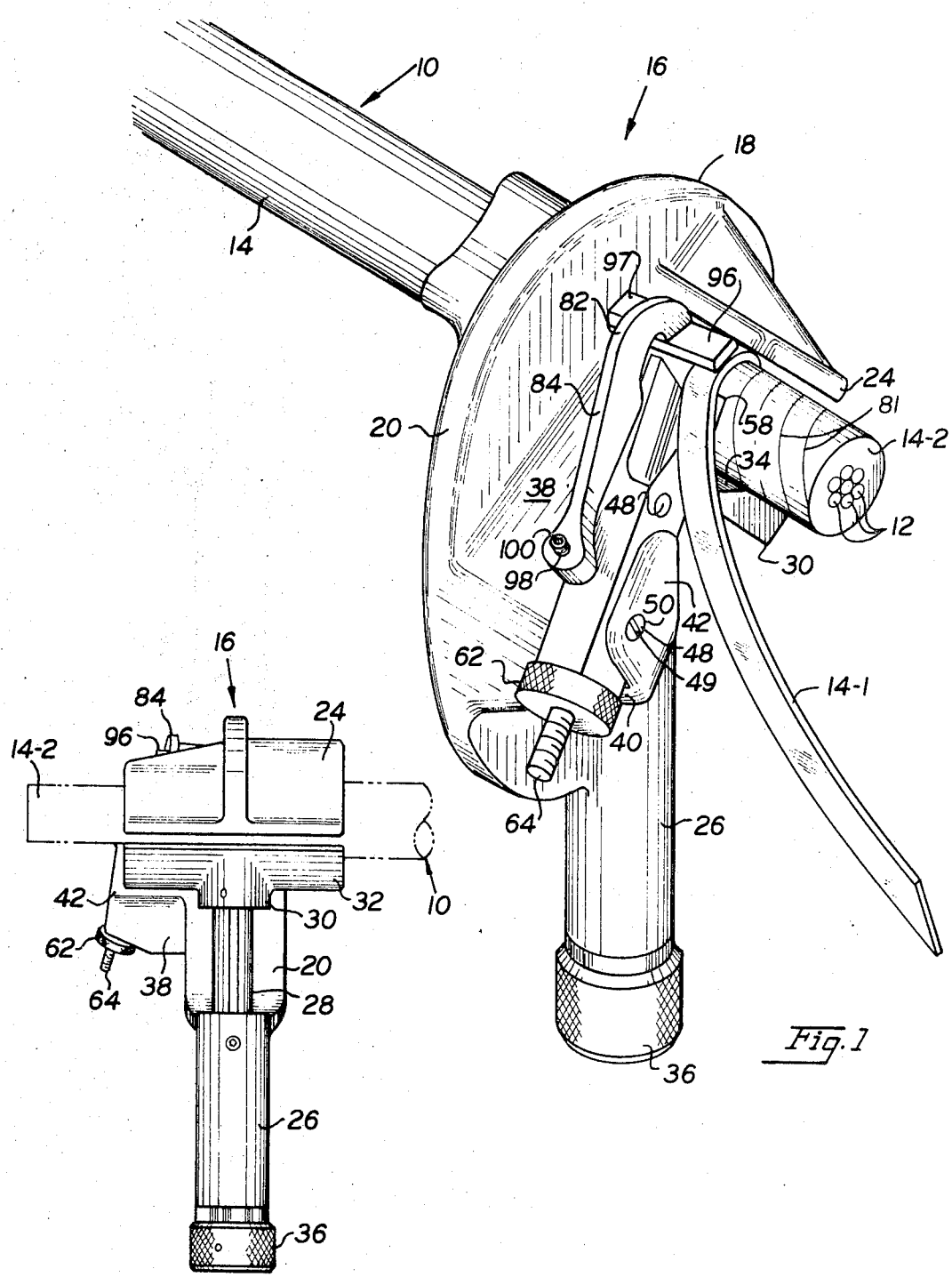

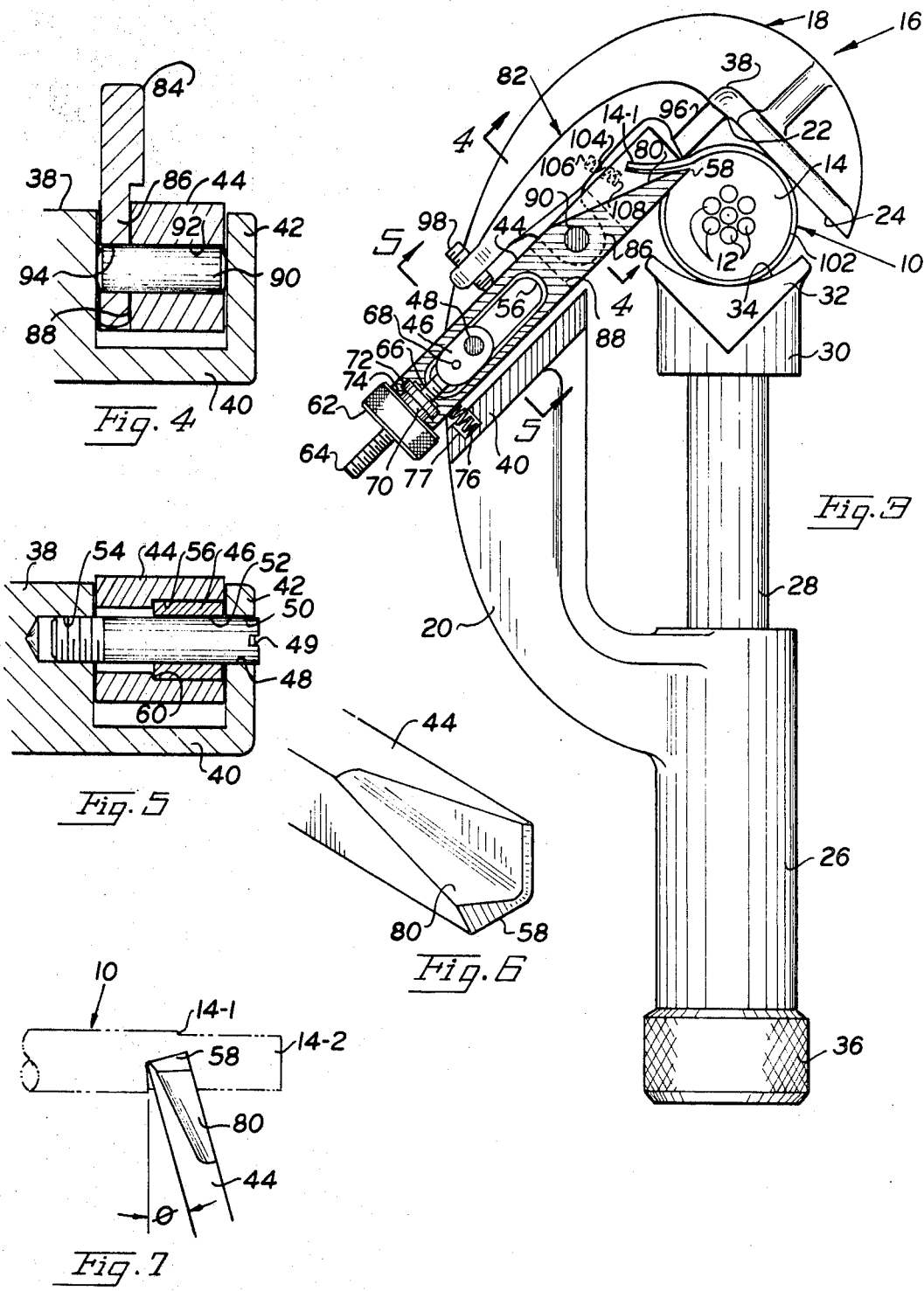

3,572,189
INSULATION JACKET SHAVING TOOL
James J. Matthews, Hicksville, N.Y.
(Landing Hill Road, East Haddam, Conn. 06423)
Filed Nov. 26, 1968, Ser. No. 778,955
Int. Cl. H02g 1/12
U.S. Cl. 81—9.5                                    10 Claims

ABSTRACT OF THE DISCLOSURE

A tool is provided for shaving and stripping the impregnated outer layer from the insulating jacket of an electrical conductor cable in which the tool has a channel for receiving the insulated conductor cable, an adjustment for adapting the size of the channel to various different diameter conductor cables, an insulation shaving blade that is operable toward or away from the conductor cable to adapt to different diameters thereof, and a limiting element to limit the depth of blade penetration of the conductor cable.

FIELD OF THE INVENTION

The invention relates to insulation shaving tools, particularly of the kind which helically shave and peel an impregnated outer layer of the insulating jacket from an electrical conductor.

THE PRIOR ART

Previous stripping tools designed for almost similar purposes as the present invention are exemplified by U.S. Pat. Nos. 3,204,495, 3,361,015 and 3,398,610 of the present inventor. These patents are generally concerned with the problem of stripping plastic insulation from an electrical conductor. Tools of this type employ an insulation stripping blade which is pivotally mounted on a frame, with means for limiting its pivotal movement. The cutting edge of the blade cuts into the insulating jacket of the conductor and travels a helical course about the circumference of the insulation jacket as the tool and the conductor are rotated relative to each other. The tool bites as deeply below the surface of the insulation as its pivotal movement will allow, so that the means which limits such motion determines the depth of cut.

The means used in prior art stripping tools for adjusting the depth of cut only has application to essentially one diameter of insulated conductor cable and for the removal of the insulation therefrom. The use of a particular stripping tool upon a different diameter conductor at best would alter the depth of cut for a given setting or adjustment of the limiting mechanism. At worst the tool would be completely useless outside a narrow range of conductor cable diameters.

Another of the problems with prior art stripping tools was that, although some of them had means for gripping the conductor cable, which were adjustable in a sense, the adjustment was basically intended only to determine the relative gripping force exerted by the tool upon the conductor cable, and was not particularly useful for accommodating the tool to a variety of conductor cable diameters outside of a narrow range of adjustment permitted by the tool construction.

SUMMARY AND OBJECTS OF THE INVENTION

In general terms, it is an object of this invention to provide an improved insulation jacket shaving tool of the general type discussed above. More specifically, the invention has as its object the provision of a jacket-shaving tool of this type in which the cutting blade is adjustable to compensate for various diameters and shapes of electrical cables. Another objective is to provide improved means for limiting and adjustment of the depth of cut in a shaving tool of this type.

Still another objective of this invention is to provide a shaving tool in which the blade has more degrees of freedom, resulting in greater versatility of operation. Yet another object is to provide a shaving tool in which the depth of cut limiting means may be mounted directly upon the shaving or cutting blade itself. A further objective is to provide a limiting means which can accommodate different conductor cable diameters without changing the depth of cut to which it was previously set.

A still further objective is to provide a shaving tool in which the device for gripping the insulated conductor cable is adjustable to accommodate various sizes of insulated conductor cables.

BRIEF DESCRIPTION OF THE DRAWINGS

FIG. 1 is a perspective view of the insulation jacket shaving tool of this invention seen in the process of shaving a surface layer or jacket of insulation from an electrical cable, FIG. 2 is a front elevational view of the same tool and insulated conductor cable, FIG. 3 is a side elevational view, with parts sectioned for clarity of illustration, of the tool and conductor cable of the previous figures, FIG. 4 is a partial sectional view, taken along the lines 4—4 of FIG. 3, of the same tool, FIG. 5 is another partial sectional view, taken along the lines 5—5 of FIG. 3, of the same tool, FIG. 6 is a perspective view of the cutting edge of the blade of the aforesaid tool, and FIG. 7 is a rear elevational view of the cutting blade and insulated conductor cable of the previous figures, illustrating the shaving relationship therebetween.

The same reference characters refer to the same elements in the several views of the drawing.

DETAILED DESCRIPTION OF THE PREFERRED EMBODIMENT

The electrical conductor, generally identified by the numeral 10, is in the form of a cable comprising a plurality of metal conductive wires 12 surrounded by an outer plastic jacket 14 composed of an outer plastic semiconductor layer 14–1 and an inner insulator 14–2. The function of the tool, generally identified by numeral 16, of this invention is to shave and remove the semi-conductor layer 14–1 of predetermined thickness from the remainder of the jacket 14, leaving the balance of the insulation 14–2 in place. When the cable 10 is utilized the semi-conductive layer 14–1 is impregnated with an electrically conductive carbon or other material thereby enabling the outer layer 14–1 to function as a semiconductor. However, it is sometimes necessary to remove a length of this outer semi-conductive layer 14–1 from the remainder of the insulation 14–2 and yet leave enough of the insulator 14–2 to insulate the wires 12.

In this type of application particularly, and in others as well, limiting and adjusting the depth of cut achieved by the insulation jacket shaving tool 16 is obviously an important consideration. It is particularly important that control and adjustment of the depth of cut be permitted even though the tool 16 is used upon a range of diameters of insulated electrical conductor cables 10.

The tool 16 comprises a frame generally identified by numeral 18 that has a curved arm 20 formed at one end with a V-shaped concave notch 22 bounded on one side by an elongated plate 24. At the other end of the curved arm 20 is a tubular housing 26 from which protrudes a cylindrical rod 28. The latter has a jaw 30 formed with an elongated block 32 which has a concavely curved surface 34 confronting the notch 22. The concave surface 34 and the notch 22 confront each other to define a channel for the insulated conductor cable 10. As best seen in FIG. 2, the plate 24 and the plate 32 are both elongated in a direction parallel to the longitudinal axis of the insulated conductor cable 10 so as to define the direction which the conductor cable 10 passes axially through the tool 16.

The cylindrical rod 28 can be adjusted to extend from or to retract into the tubular housing 26 by means of a knurled knob 36 at the opposite end of the housing 26. Within the housing is a conventional screw thread connection (not shown) between the knob 36 and the rod 28, such that rotation of the knob 36 in the proper direction causes the desired axial movement of the rod. In this way the spacing between the concave surface 34 and notch 22 can be adjusted over a very wide range to vary the width of the channel 22, 34 which receives the insulated conductor cable 10. As a result the channel can be enlarged or diminished to accommodate many different conductor cable diameters.

Once the conductor cable 10 is in place within the channel, the adjusting knob 36 has further utility as a means for adjusting the clamping pressure exerted on the insulated conductor cable 10 by the movable jaw 30. The clamping pressure should be such that the conductor cable 10 is held firmly, but can rotate about its longitudinal axis and also feed through the shaving tool 16 in a direction parallel to its axis.

On one side of the curved arm 20 is a thickened boss 38 from which projects a lip 40 ending in an upstanding flange 42 which extends into opposed relationship with the boss 38. The function of the boss 38, lip 40 and flange 42 is to mount the insulation shaving blade 44 of the tool 16. More specifically, the blade 44 is mounted in such a way that it is movable relative to the frame 18 so as to slide closer to, or further away from, the insulated conductor cable 10 for accommodating different conductor diameters.

This adjustable relationship is achieved by providing a mounting element 46 which is received within a seat defined by the boss 38, lip 40 and flange 42. The element 46 is pivotally mounted therein by means of a cylindrical pin 48 which passes through a suitable opening 50 formed in the flange 42 and a similar opening 52 formed in the mounting element 46. The outer end of the pivot pin 48 is formed with a screw driver slot 49, while the inner end is threaded into a tapped hole 54 in the boss 38 (see FIG. 5). In this way the element 46 is mounted for rocking movement about its pivot pin 48.

The blade 44 is assembled with the mounting element 46 in a manner to partake of this rocking movement. Specifically, the blade 44 is formed with an elongated channel 56 in which the mounting element 46 is slidably accommodated. Moreover, the entire assembly of the blade 44 and its mounting element 46 are received within the seat defined by the boss 38 and the confronting flange 42. Thus, the pivot pin 48 serves to fix the mounting element 46 in position against axial reciprocation, while permitting it to rock pivotally about the pin. The blade 44 however is able to slide longitudinally relative to the element 46 as well as pivot therewith about the pin 48.

The axial motion of blade 44 along and relative to the mountnig element 46 serves to position its cutting or shaving edge 58 thereof toward or away from the surface of the jacket 14 of conductor cable 10. As a result, the blade 44 can be withdrawn to accommodate a larger diameter conductor cable 10, for it can be advanced closer to a conductor cable 10 of smaller diameter.

The interior of the longitudinal channel 56 is formed with a step 60 which abuts against the side of the mounting element 46 to guide the blade 44 as it is adjusted longitudinally relative to the mounting element. The adjustment of the blade 44 is accomplished by turning a knurled wheel 62, which is threadedly engaged with a threaded stem 64 projecting through an opening 66 in the blade 44. One end of the stem 64 extends into and is fixed in an opening (not shown) in the mounting element 46.

A pin 68 passes transversely through the mounting element 46 and also through the end of the stem 64 to lock the stem and element together. The wheel 62 is mounted within and is prevented from moving axially relative to the blade 44 by means of a tubular extension 70 formed with a circular shoulder 72 which is imprisoned behind a pair of opposed flanges 74 formed at the tail end of the blade 44. Thus, when the wheel 62 is rotated it advances axially along the threaded stem 64 and carries the blade 44 with it by virtue of the interengagement between elements 72 and 74. This enables the axial position of the blade 44 to be selected relative to the mounting element 46, so that the position of the cutting edge 58 can be selected relative to the surface of an insulated conductor cable 10 of any diameter within a wide range.

The pivotal motion of mounting element 46 and blade 44 about the pivot pin 48 enables a biasing spring 76, which is received within a cylindrical socket 77 formed in the lip 40, to constantly urge the blade 44 and its mounting element 46 in a clockwise rocking direction about the pivot pin 48. As a result, the cutting edge 58 of the tool is caused to bear against the jacket 14, and to cut into and below the surface thereof as the insulated conductor cable 10 and shaving tool 16 are rotated relative to each other.

In using the shaving tool 16, the operator first turns the knob 36 to retract the jaw 30, then inserts the insulated conductor cable 10 into notch 22 and turns knob 36 the opposite way to tighten jaw 30 against the conductor cable until the appropriate and desired clamping pressure is achieved. The blade 44 and its mounting element 46 is pivoted about the pivot pin 48 in response to the biasing force of spring 76 to move the blade 44 into the way of the end of the insulated conductor cable 10. This does not disturb the previous adjustment to which the blade 44 has been set by means of the wheel 62.

Subsequently, the blade 44 is allowed to rotate back in a clockwise direction about pin 48 under the influence of the biasing spring 76, so that as a result, the cutting edge 58 of the blade 44 abuts against the end of the cable 10 and of the jacket 14 to actually block the path of movement of the cable through the tool. Thereafter, the operator grasps the tubular housing 26, which conveniently serves as a handle for the entire tool 16, and with the cable 10 held against rotation, he then rotates the shaving tool 16 about the longitudinal axis of the insulated conductor cable 10.

As he does so, the cutting edge 58 bites into the abutting end of the cable 10 and progressively the surface of the layer 14–1 of the plastic jacket 14, owing to the pressure of the biasing spring 76 and the camming effect of a surface 80 of the blade which slopes toward the cutting edge 58. Consequently, the blade 44 cuts into the cable during the relative axial movement of the cable and tool and shaves off the layer 14–1 as the shaving tool 16 is rotated about the conductor cable 10.

The seat 38, 42 in which the blade 44 is disposed is angled relative to the channel 22, 34 which receives the insulated conductor cable 10. As a result, the blade 44 at an oblique angle of 90° plus theta ($\theta$) to the longitudinal axis of the conductor cable 10, as seen in FIG. 7. This causes the blade 44 to traverse a helical course about the surface 14 of the insulated conductor cable 10 as the tool 16 is rotated. Thus, the tool 16 screw feeds axially along the conductor cable 10 which moves relatively axially through the channel 22, 34. During this relative movement, the layer 14–1 is shaved and unwound helically from the jacket 14. In FIG. 1, the helical marks 81 show the "screw thread" track left by the blade 44 as it shaves and peels off the layer 14–1.

Because of the tendency of the clockwise biased blade 44 to dig progressively deeper into the cable 10 during the relative rotation of the tool 16, some means must be provided to prevent the blade 44 from biting too deep into the jacket 14 as the helical progress takes place. This function is accomplished by a depth of cut limiting mechanism generally identified 82, which is mounted upon the blade 44 itself. As a result, the mechanism 82 has the advantage of moving along with the blade 44 when the latter is adjusted longitudinally by means of the wheel 62 to accommodate different diameters of insulating conductor cables 10. This enables the mechanism 82 to limit the depth of cut of the blade 44 relative to the surface of the jacket 14, and without regard to the diameter thereof. Thus, it accommodates its limiting action to different size conductor cables; a distinct advantage over previous mechanisms which could only provide the desired depth of cut for one conductor cable diameter without readjustment.

The mechanism 82 comprises a rocker arm 84 formed with a centrally located perpendicularly extending tongue 86 which is accommodated within an enlarged recess 88 formed in the cutting tool blade 44 as best seen in FIGS. 3 and 4. A pivot pin 90 extends through appropriate aligned openings 92 and 94 formed in the blade 44 and tongue 86 respectively, to mount the arm 84 for rocking motion relative to the blade 44.

One end of the arm 84 is formed with a crossbar 96 extending substantially perpendicularly thereto. The function of the crossbar 96 is to initially contact and remain in contact with the as yet uncut surface of the jacket 14 ahead of the cutting edge 58, using that surface as a reference for the purpose of limiting penetration therebelow. Contact of the crossbar 96 against the outer surface of the jacket 14 of course limits the movement of the rocker arm 84 to the insulated conductor cable 10. A stop member 98, which is threaded through the tail end of the arm 84, serves to space the tail of the arm 84 relative to the blade 44 and thereby limit the clockwise rotation of the blade 44 about the pivot pin 90 when the crossbar 96 engages against the jacket 14.

In other words, the crossbar 96 makes the rocker arm 84 a fixed reference for the pivotal motion of the blade 44 around the pivot pin 90. With the crossbar 96 engaging the jacket 14, as the blade 44 attempts to pivot clockwise, as seen in FIG. 3, so that the cutting edge 58 can bite deeper into the cable 10, the screw 98 engaging the opposite end of the blade 44, limits the extent of such motion. The screw 98 is adjustable by virtue of its threaded engagement with the arm 84, to select the precise depth of shave of the blade 44 as may be desired. A socket 100 (see FIG. 1) is provided at the end of the limiting screw 98 for receiving a hexagonal wrench used in making this adjustment.

In FIG. 3, a line 102 is shown which defines the depth to which the semi-conductive insulating jacket 14–1 is impregnated with electrically conductive material. Since the objective is to shave off all of this impregnated layer 14–1 without sacrificing any more of the remainder 14–2 of the jacket 14 than is necessary, the wrench adjustment of the limiting screw 98 is preferably such that the cutting edge 58 of blade 44 digs into the insulator 14–2 and cuts slightly below the line 102.

A spring 104 is received within sockets 106 and 108 formed in the arm 84 and blade 44 respectively. This spring 104 serves to bias the blade 44 as far as possible in a clockwise sense about the pivot pin 90, so that the depth of cut of the blade reaches the maximum level permitted by the limiting screw 98.

It will be realized that as the blade 44 is pivoted by spring 76 in a clockwise direction, so too is the related rocker arm 84. Hence, although the adjustable stop 98 relatively spaces the crossbar 96 and the cutting edge 58 from each other to control the thickness of the layer 14–1 to be shaved and removed between them, there must be some means to limit the extent to which both the blade 44 and rocker arm 84 will pivot about the pin 90. Otherwise, both the blade edge 58 and the arm 84 will pivot unrestrictedly radially inward toward complete obstruction of the center of the cable 10.

In the mechanism 82 the crossbar 96 extends in overlapping relation with the cable channel and the blade edge 58 to control the relative space between them. The opposite side of the crossbar 96 includes an extension 97 which overlaps the thickened boss 38 of the curved arm 20. Upon the initial axial application of the tool 16 to the end of a cable 10, or of the cable axially into the channel of the tool, the cable is first positioned within the confines of the clamp mechanism. From the drawing, it will be noted that the crossbar 96 is also positioned within the confines of the clamp mechanism so that the crossbar 96 must come into initial contact with the outer surface of the cable when the cable is received in the channel of the tool. Thereafter, the clamp is tightened about the cable by the adjustment of the knob 36 until the cable is held firmly but rotatably in the channel. When so positioned, the cutting edge 58 of the blade 44 abuts the cable end and obstructs the path of further axial movement of the cable or tool relative to each other.

Before the cable is received in the tool channel, the radial depth to which the cutting edge 58 and crossbar 96 extend into the channel is limited by the engagement of the crossbar extension 97 with the boss 38. The location of the relative engagement between the extension 97 and the boss 38 is initially preselected to assure that the crossbar 96 always will be engaged by any cable 10 positioned in the tool channel and that the blade 44 will always shave the desired layer 14–1 from the jacket 14. Even in the use of the tool 16 with such cables 10 that may be of very small diameter or unusually out-of-round, the preselected relative engagement of extension 97 with boss 38 permits the blade 44 to fully shave and remove the desired layer 14–1.

Although not shown, it will be realized that an adjustable screw can be applied to the extension 97 to vary the height of engagement between the extension 97 and crossbar 96. When the tool is used, it is desirable to have the crossbar 96 located near the outer surface of the cable so the blade need not be moved manually to lift it and the crossbar out of the cable path, but rather, enable the cable to slide beneath the crossbar and lift it as the clamp is closed. If the crossbar 96 and edge 58 extend too deeply into the channel path, they must be lifted manually out of the channel before the cable can be inserted into the channel. But, if the engagement of the extension 97 and boss 38 is properly selected, the crossbar 96 will not block the channel too deeply and the cable can be inserted into the channel and thereupon immediately engage the crossbar without the necessity of manually lifting the crossbar or the blade 44.

During the operation of the tool 16 on insulated cables of uneven or irregular circular shapes, the free pivoting movement of the blade 44 about the pin 48 enables its cutting edge 58 to continuously cut into the insulation 14. The depth of shaving to be made by the blade is limited by the space between the crossbar 96 and the edge 58, while the crossbar functions as a follower as it moves over and around the insulation it engages. Thus, the depth of penetration remains constantly the same once the space is selected between the crossbar 96 and the edge 58, even though the cable 10 may be unevenly or irregularly shaped.

Since the foregoing description and drawings are merely illustrative, the scope of protection of the invention has been more broadly stated in the following claims; and these should be liberally interpreted so as to obtain the benefit of all equivalents to which the invention is fairly entitled.

What is claimed is:

1. In an insulation jacket shaving tool for removing an insulation jacket from conductor cables of different sizes and shapes wherein the tool has a frame and channel means on the frame adjustable to engage different size and shape cables and to support the tool for movement relative to such cables, the improvement comprising
    a blade for shaving a thickness of insulation from the cable engaged by the channel,
    means mounting said blade for movement relative to said frame and to cause said blade to move to a selected position relative to the cable for penetration into the insulation jacket of the cable, and
    depth limiting means engageable with the insulated jacket during relative movement of the cable and tool to limit the depth of penetration of the blade into the cable insulation jacket.

2. In an insulation jacket shaving tool as in claim 1, means biasing said blade in a direction to maximize the depth of penetration of said blade into the cable insulation jacket.

3. In an insulation jacket shaving tool as in claim 1, said depth limiting means including an arm movable relative to said blade,
    engaging means on said arm for engaging the insulated jacket, and
    means to adjust said blade and depth limiting means relative to each other to selectively space said engaging means and blade from each other a distance equal to the thickness of the insulated jacket to be shaved by said blade.

4. In an insulation jacket shaving tool as in claim 1, said blade mounting means including means to enable said blade to be moved in a plurality of directions toward and away from the cable engaged by the channel.

5. In an insulation jacket shaving tool as in claim 4, said means enabling said blade to be moved in a plurality of directions including a pivot to pivotally mount said blade to said frame and means operable to move said blade lengthwise toward and away from the cable engaged by the channel.

6. In an insulation jacket shaving tool as in claim 5, said pivot mounting a slide to said frame,
    said blade being connected with said slide for relative movement, and
    a manually operable screw connecting said blade and slide to move said blade lengthwise.

7. In an insulation jacket shaving tool for electrical cables and wherein the tool and cable are adapted to be moved relative to each other,
    a blade movable on said tool and having a cutting edge selectively adjustable to penetrate the insulation jacket of a cable to a selected depth to shave the jacket from the cable about the selected depth as the tool and cable move relative to each other,
    means to move said blade to selectively adjust the cutting edge of said blade to the selected depth of penetration of the insulation jacket,
    limit means on said tool engaging the insulation jacket and restraining said cutting edge from penetrating the cable insulation jacket beyond said preselected depth during relative movement of the tool and cable, and
    means connecting said blade and limit means to enable said cutting edge to penetrate the insulation jacket of the cable to the selected depth with said limit means engaging the cable insulation jacket.

8. In an insulation jacket shaving tool as in claim 7,
    said blade cutting edge and limit means being adjustable to define a space between them at which said limit means engages the insulation jacket and the cutting edge shaves the same at the selected depth, and
    said connecting means being adjustable to vary said space to vary the selected depth of shaving by said cutting edge.

9. In an insulation jacket shaving tool as in claim 8,
    means biasing said blade to move the same into penetration of the insulation jacket,
    means between said limit means and blade to bias said connecting means into engagement with the insulation jacket, and
    said connecting means being adjustable in opposition to the last named biasing means.

10. In an insulation jacket shaving tool as in claim 8, and
    means mounting said blade on said tool for pivotal movement and lengthwise movement toward and away from the cable insulation jacket.

References Cited
UNITED STATES PATENTS

| | | | |
|---|---|---|---|
| 3,057,232 | 10/1962 | Cornell | 81—9.5 |
| 3,204,495 | 9/1965 | Matthews | 81—9.5 |
| 3,377,891 | 4/1968 | Horrocks | 81—9.5 |
| 3,375,579 | 4/1968 | Slonksnes | 81—9.5X |

THERON E. CONDON, Primary Examiner

R. L. SPRUILL, Assistant Examiner

U.S. Cl. X.R.

30—90.1